Oct. 9, 1962 — J. F. CUBBIDGE ETAL — 3,057,452
ARTICLE TRANSFER APPARATUS
Filed Sept. 23, 1960 — 2 Sheets-Sheet 1

INVENTORS
J. F. CUBBIDGE
A. L. DIXON
BY A.C. Schwarz, Jr.
ATTORNEY

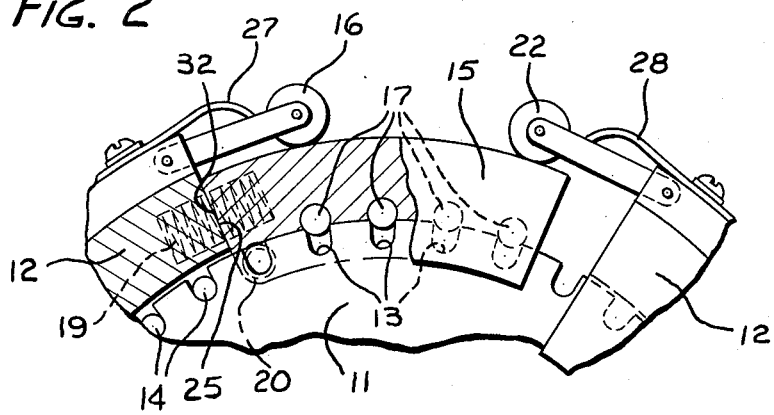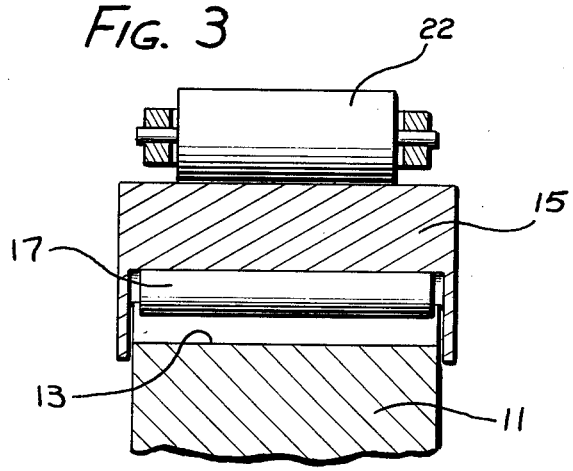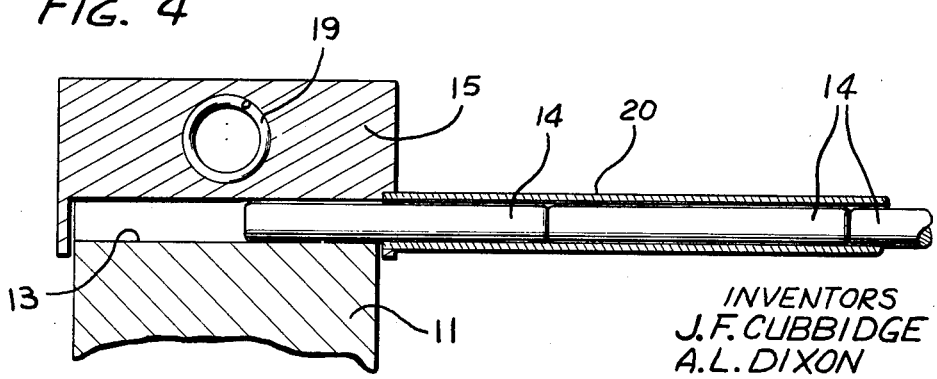

3,057,452
ARTICLE TRANSFER APPARATUS
James F. Cubbidge, Naperville, and Alfred L. Dixon, Western Springs, Ill., assignors to Western Electric Company, Incorporated, New York, N.Y., a corporation of New York
Filed Sept. 23, 1960, Ser. No. 57,955
3 Claims. (Cl. 198—25)

This invention relates to article transfer apparatus, and more particularly to continuously rotating transfer apparatus for receiving articles such as electrical units including resistors and the like, and for indexing such articles to predetermined positions, such as onto a conveyor.

In the transfer of electrical articles it is often desirable for the transfer operation to be performed in a relatively gentle manner so that certain properties of the articles are not altered during transfer. For example, slight distortion of resistance films of carbon deposited resistors brought about during transfer causes the resistors to vary significantly as to electrical characteristics.

It has been particularly difficult to feed articles selectively to predetermined positions in a rotary transfer apparatus while the apparatus is rotating. It has been proposed in the past to feed articles selectively to predetermined positions in a rotary moving transfer apparatus by rolling the articles down conventional inclined chutes. This, however, in the case of such electrical units as carbon deposited resistors has been found to be unsatisfactory in that the resistance films are not uniform because the units invariably rub against not only the confining portions of the chutes but also against resistance surfaces of one another as they are advancing towards the moving rotary transfer apparatus.

It is, therefore, an object of this invention to provide an improved apparatus for transferring articles.

It is another object of the invention to provide apparatus for gently positioning articles onto a rotary transfer apparatus.

Another object of the present invention is to provide an apparatus for feeding articles selectively to predetermined positions in a continuously rotating transfer device.

Still another object of the instant invention is to provide, in a rotary article transfer apparatus, a reciprocable shuttle device for feeding articles to predetermined positions in the transfer apparatus while the transfer apparatus is continuously rotating.

A further object of the invention is to provide, in a continuously rotating transfer apparatus containing an oscillating article positioning shuttle, a flexible article feeding device which is attached to and movable with the shuttle for introducing articles into the transfer apparatus while the shuttle is oscillating in the direction of rotation of the transfer apparatus.

With these and other objects in mind, the present invention contemplates a transfer apparatus comprising a continuously rotating disc having a plurality of peripheral grooves, which extend in a direction parallel to the axis of rotation of the disc, for receiving articles to be transferred, such as carbon deposited resistors. The apparatus further contains an oscillating shuttle selectively engaging at least one groove of the disc, wherein the shuttle has secured thereto a flexible tube adapted to insert an article, such as a resistor, by means of compressed air, into one of the grooves in the disc not engaged by the shuttle. This inserting action takes place while the shuttle is oscillating in the direction of rotation of the disc and while both the shuttle and the disc are moving at the same rate of speed due to the fact that the shuttle is engaging a groove of the disc.

After an article has been inserted into a groove in the disc and both the disc and shuttle have moved in a first direction to a predetermined extent, the shuttle is freed from the disc by a camming action which terminates movement of the shuttle in the direction of the rotating disc and enables the shuttle to be reciprocated to its initial position by oscillating in a direction opposite to that of the rotating disc by means of a compression spring or the like. This reciprocation permits the shuttle again to be adapted to feed another article such as a resistor into a subsequent groove in the continuously rotating disc of the transfer apparatus.

A more complete understanding of the invention may be obtained, and other objects, advantages, and novel features thereof will become apparent, by reference to the following detailed description of a preferred embodiment of the invention when taken in conjunction with the accompanying drawings, in which FIG. 1 is a side elevational view, partially broken away, of the transfer apparatus of the invention showing the shuttle mechanism in a first operative position;

FIG. 2 is a fragmentary side elevational view, partially broken away, of the shuttle mechanism of the transfer apparatus of FIG. 1 but showing the mechanism in a second operative position;

FIG. 3 is an enlarged sectional view taken along the plane of line 3—3 of FIG. 1 and looking in the direction of the indicating arrows; and FIG. 4 is an enlarged sectional view taken along the plane of line 4—4 of FIG. 1 and looking in the direction of the indicating arrows.

Figure 1:
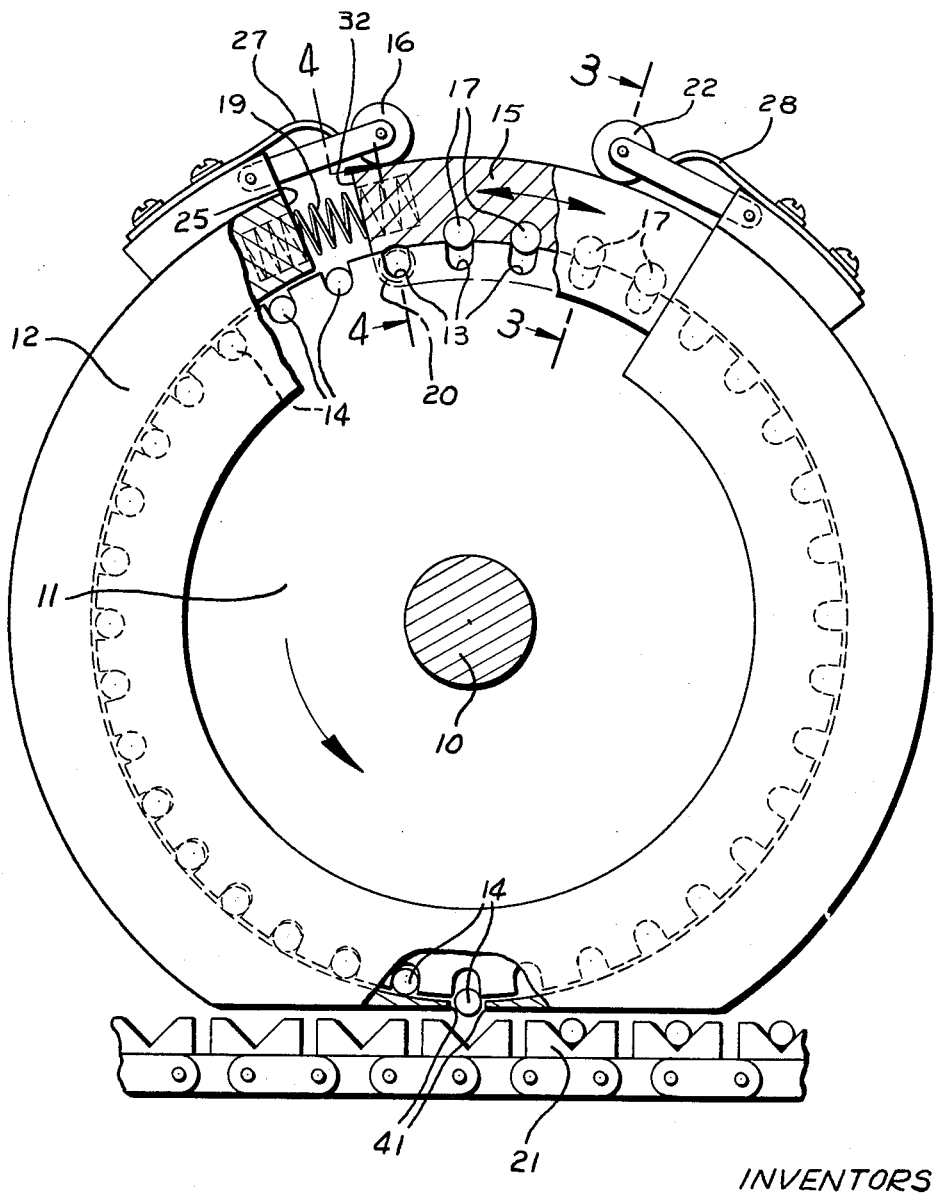

Referring now to the drawings, wherein like reference numerals designate similar parts throughout the various views, there is shown a continuously rotating article transfer apparatus particularly designed for transferring carbon deposited resistors, comprising a disc 11 which is continuously rotatable in a predetermined direction. The disc 11 is rotatably mounted on an axle 10 and rotates within a housing 12. The disc 11 is suitably rotated by a device not shown. The disc 11 contains a plurality of peripheral grooves 13 for receiving articles, such as carbon deposited resistors 14. The grooves 13 are preferably equally spaced, and extend through the disc 11 in a direction parallel to the axis of rotation of the disc 11.

Movably mounted on the periphery of the continuously rotating disc 11 is a shuttle 15 which is caused to move with the disc 11 (against the action of a compression spring 19) by pins 17 of the shuttle 15 which engage certain of the grooves 13 in the disc 11 due to the action of pivoted rollers 16 and 22 which bear against the shuttle 15 due to the biasing action of leaf springs 27 and 28.

It can be seen from FIG. 4 of the drawings that the shuttle 15 further contains connected thereto a flexible tube 20 containing therein a plurality of the resistors 14. The tube 20 is movable with the shuttle 15 and is conventionally adapted, by means of compressed air from an air compressor (not shown), to selectively feed the resistors 14 from the tube 20, one at a time, into the grooves 13 of the rotating disc 11.

In operation, assuming the shuttle is all the way to the right as shown in FIG. 1 of the drawings, in this position the pins 17 of the shuttle 15 are engaged by the grooves 13 of the disc 11 and the flexible feed tube 20 of the shuttle 15 is aligned with one of the non-engaged grooves 13 in the disc 11.

As the continuously moving disc 11 rotates in a counterclockwise fashion, it carries the shuttle 15 with it against the action of the compression spring 19 since the discs 11 and the shuttle 15 are interlocked by the pins 17 of the shuttle 15 engaging the grooves 13 of the disc 11.

While the pins 17 are thus engaged within the grooves 13, and the disc 11 and the shuttle 15 are therefore moving together in the same direction and at the same rate of speed, a resistor 14 is fed by compressed air from the flexible tube 20 of the shuttle 15 into one of the non-engaged grooves 13 of the disc 11.

As shown in FIG. 2 of the drawings, the leading face 32 of the shuttle 15 then engages a stop 25 projecting from the housing 12 which terminates motion of the shuttle 15. The disc 11, however, continues to rotate causing the pins 17 of the shuttle 15 to be cammed up and out of the grooves 13 of the disc 11 whereupon the compression spring 19 urges the shuttle 15 back to the right to its initial position. After the shuttle has moved completely back to the right, the pins 17 of the shuttle 15 engage the next successive grooves 13 of the disc 11 due to the action of the springs 27 and 28.

The shuttle 15 is then again moved continuously to the left with the disc 11 as the compressed air feeds a subsequent resistor 14 from the flexible tube 20 into the next succeeding groove 13 of the disc 11.

After each successive resistor 14 has cleared the shuttle 15, the resistors 14 are held within the grooves 13 of the continuously rotating disc 11 by the housing 12 and may receive color bands or be otherwise treated by a device (not shown) extending into the housing 12 in a manner well known in the art. After the disc 11 has rotated counterclockwise approximately 180°, each resistor 14 may then drop out from within the groove 13 of the disc 11 onto a synchronously moving conveyor 21 by falling through an aperture 41 in the housing 12.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. Apparatus for feeding a succession of articles, one at a time, into a series of spaced article-receiving grooves in the outer periphery of a continuously rotating disc, which comprises:

a shuttle mounted adjacent to the outer periphery of the disc for oscillating rotational movement about the axis of rotation of the disc;

means for temporarily coupling said shuttle to the disc for rotational movement therewith, said coupling means being so constructed and arranged that said shuttle bears a fixed position relative to the next advancing groove to be filled when said shuttle is coupled to the disc;

means for feeding an article into the next advancing groove in the disc when said shuttle is coupled to the disc, said feeding means being connected to said shuttle in a fixed position relative thereto such that said feeding means aligns with the next advancing groove when said shuttle is coupled to the disc; and means for returning said shuttle to an initial position thereof after the article has been fed into the groove, in preparation for another feeding operation.

2. The apparatus as recited in claim 1, wherein means are provided for urging the shuttle against the outer periphery of the disc;

wherein the means for temporarily coupling the shuttle to the disc comprises at least one pin secured to the shuttle and designed to partially enter an empty groove in the disc other than the one next to be filled, the grooves being designed upon the partial entry of said pin to bear against said pin to move the shuttle with the disc; and wherein a stop is provided for intercepting the movement of the shuttle with the disc after a groove has been filled, the grooves being further designed to cam the pin out of the groove which it had entered partially, against the action of said shuttle-urging means as said shuttle contacts said stop, after which the disc is free to move past the shuttle and the returning means operates to move the shuttle back to the initial position thereof with the pin riding on the outer surface of the disc until a subsequent groove is rotated into alignment with said pin, at which time said urging means forces the shuttle against the disc and said pin partially into the subsequent groove to again couple the shuttle to the disc for movement therewith.

3. Apparatus for feeding a succession of elongated cylindrical articles, one at a time, into a series of equally spaced article-receiving grooves in the outer periphery of a continuously rotating disc, the grooves extending through the disc in a direction parallel to the axis of rotation, the disc being mounted for rotation within a stationary arcuate housing having a U-shaped cross section with leg portions which cover the grooves to retain the articles in the grooves as the disc rotates, which feeding apparatus comprises:

an arcuate shuttle curved to fit against the outer periphery of the disc and spanning the arc defined by at least three successive grooves, said shuttle having a U-shaped cross section with leg portions which fit over the sides of the disc and cover the grooves, said shuttle being mounted about the axis of rotation of the disc, the housing being provided with a gap in which the shuttle is received and defining stops which permit limited oscillating movement of said shuttle;

a pair of spring-pressed pivoted rollers mounted on the housing adjacent to each side of the gap for engaging the outer surface of said shuttle to urge said shuttle against the outer periphery of the disc;

a compression spring received between said shuttle and the housing for urging said shuttle in a direction opposite to the direction of rotation of the disc to an initial position against a rearward one of the stops;

a plurality of pins secured to said shuttle between the leg portions which fit over the sides of the disc, said pins being spaced along said shuttle a distance equal to the spacing between adjacent grooves in the disc, said pins being designed to partially enter adjacent grooves in the disc by the action of said rollers, the grooves being designed to bear against said pins to move said shuttle with said disc about the axis of rotation of said disc through a small angle from the initial position thereof to an advanced position where said shuttle contacts a forward one of the stops;

and a flexible feeding tube through which the articles are fed, connected to said shuttle with a discharge end thereof in alignment with a forward one of the grooves when said pins are engaged with certain grooves and said shuttle is moving with the disc to feed one article into one groove of the disc, the grooves being further designed to cam said pins out of the grooves which they had entered partially, against the action of said spring-pressed rollers, as said shuttle contacts the forward stop, after which the disc is free to move past said shuttle and said compression spring operates to move said shuttle back to the initial position thereof with the pins riding on the outer surface of the disc until subsequent grooves are rotated into alignment with said pins.

References Cited in the file of this patent

UNITED STATES PATENTS

| | | |
|---|---|---|
| 1,492,864 | Straight | May 6, 1924 |
| 2,744,601 | Chilton | May 8, 1956 |